United States Patent

Malkowski et al.

[15] 3,639,225
[45] Feb. 1, 1972

[54] TOOL-CHANGING DEVICE

[72] Inventors: Leonard R. Malkowski, La Grange; Sigmund H. Bielak, Downers Grove, both of Ill.

[73] Assignee: Anocut Engineering Company

[22] Filed: Jan. 20, 1970

[21] Appl. No.: 4,209

[52] U.S. Cl. ............................204/212, 204/224, 204/225, 204/297 R
[51] Int. Cl. .....................C23b 5/68, B23p 1/12, C23b 5/70
[58] Field of Search ..................204/143 R, 143 M, 224, 225, 204/212, 297

[56] References Cited

UNITED STATES PATENTS

| | | | |
|---|---|---|---|
| 3,443,054 | 5/1969 | O'Connor | 204/143 X |
| 3,450,618 | 6/1969 | Sutton | 204/225 X |
| 3,459,645 | 8/1969 | Wilson et al. | 204/224 X |

*Primary Examiner*—John H. Mack
*Assistant Examiner*—D. R. Valentine
*Attorney*—Dressler, Goldsmith, Clement & Gordon

[57] ABSTRACT

Mechanism for replacing electrode tools supported in a holder of an electromechanical machining device and in which the holder clamps the tool and automatically provides an electrolyte flow path as well as an electrical current flow path to the tool. The tool changer is capable of releasably supporting a plurality of electrode tools, with each tool capable of being selectively aligned with the tool holder. The tool-changing device further includes mechanism for automatically removing the electrode tool from a tool support and placing the electrode tool in the holder. The entire operation is designed to be automatically performed without the necessity of an operator making any connections or disconnections.

25 Claims, 12 Drawing Figures

TOOL-CHANGING DEVICE

BACKGROUND OF THE INVENTION

The present invention relates generally to electrochemical machining devices and more particularly to an improved device which is capable of performing a plurality of operations on a workpiece.

The use of electrolytic demetallizing for shaping workpieces has become very popular in the past few years. Basically, in such a machining process, an electrode is brought into adjacent relationship with a workpiece and is spaced a small distance from the workpiece, with liquid electrolyte passed under pressure across the space or gap between the electrode and the workpiece. At the same time, electric current is passed between the electrode and the workpiece through the rapidly moving stream of electrolyte in a sense to make the workpiece anodic. Under these conditions, the workpiece can be smoothly eroded into a large variety of shapes to produce articles having very complex configurations. A broad description of such a machining operation is supplied in U.S. Pat. Ser. No. 3,058,895.

So far as applicants are aware, it has heretofore been necessary to stop the machining operation and have a workman physically replace the movable electrode tool whenever a variety of shapes and configurations of the workpiece were desired. Such an arrangement has resulted in a major portion of the time of an electrochemical machine being idle while the operator physically removes one electrode tool and attaches another to a tool support.

Another problem encountered in electrolytic demetalizing is to provide a movable support for the workpiece so as to allow a plurality of surfaces of the workpiece to be exposed to the electrode tool. Heretofore, it has been considered necessary to attach the electric current-carrying cables directly to the workpiece so as to make the workpiece anodic during a machining operation.

SUMMARY OF THE INVENTION

According to the present invention, an electrochemical machining apparatus of the type disclosed in our copending application Ser. No. 755,561, filed Aug. 27, 1968, now U.S. Pat. No. 3,568,876, may readily be modified to allow the apparatus to perform several distinct machining steps on a particular part, either at a fixed location on the part or at a plurality of locations on the workpiece or part.

This is accomplished by providing an automatic electrode tool-changing apparatus or mechanism releasably supporting a plurality of electrode tools which may be supplied to a holder and may be removed and replaced without the manual steps heretofore considered necessary. The electrode tool-changing mechanism includes a base supported above the path of movement of an electrode tool holder. The base supports a table or turret having a plurality of tool supports defined thereon. Each of the tool supports is adapted to receive an electrode tool therein and the table is capable of being moved relative to the base to selectively align respective tools with respect to the tool holder. The tool-changing mechanism further includes means for automatically removing the electrode tool from its support on the table and placing the electrode tool in the holder.

According to one aspect of the present invention, the electrode tool holder receives the tool and automatically locks the tool relative to the holder in a manner that will provide an electrolytic flow path through the tool and holder as weld as providing a current flow path. This is accomplished by providing a continuous recess around the electrolyte flow path which intersects adjacent surfaces of the tool and holder so that the recess channels away any electrolyte that might escape from the flow path into the space between the surfaces and in the area immediately adjacent the edge of the flow path. Such an arrangement prevents buildup of forces from the escaping electrolyte that would tend to push away the cooperating surfaces and break electrical contact which is provided across the surfaces at a point outwardly from the electrolyte flow path.

According to another aspect of the invention, the tool-changing mechanism also incorporates mechanism for automatically positioning the electrode tool relative to the holder as the electrode tool is placed in the holder so as to insure a proper relationship between the electrode tool and the workpiece during a machining operation. This is accomplished by providing spaced contact points on the tool holder and having an adjustable wedge element carried by a platen which supports the shaping cathode to properly position the cathode relative to the workpiece.

The tool-changing mechanism also includes relatively movable elements in the form of a fluid cylinder and piston rod, one of which is supported on the base and the other of which has a member for attachment to an electrode tool. Each electrode tool is releasably retained in its support and is adapted to be moved from the support to the tool holder by the relatively movable elements.

According to another aspect of the present invention, the control mechanism for the electrode tool-changing device is completely automated so that it will not need the attention of an operator, other than to insure that the machine is functioning properly.

Furthermore, the electrochemical machining apparatus of the present invention incorporates mechanism which will allow an operator to locate different portions of the workpiece in the path of movement of the shaping cathode. The workpiece-supporting mechanism allows for an indefinite amount of relative movement between the workpiece-supporting member and the base for the supporting member. This is capable of being performed by providing automatic remotely controlled mechanism for attaching and detaching the current supply to the workpiece through the supporting member. Thus, the current supply may be remotely disconnected so that the workpiece supporting table can be rotated an indefinite amount relative to the base by remote controlled mechanism.

BRIEF DESCRIPTION OF THE SEVERAL VIEWS OF THE DRAWINGS

A more detailed explanation of the invention is provided in the following description and claims, and is illustrated in the accompanying drawings, in which;

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Figure 1:
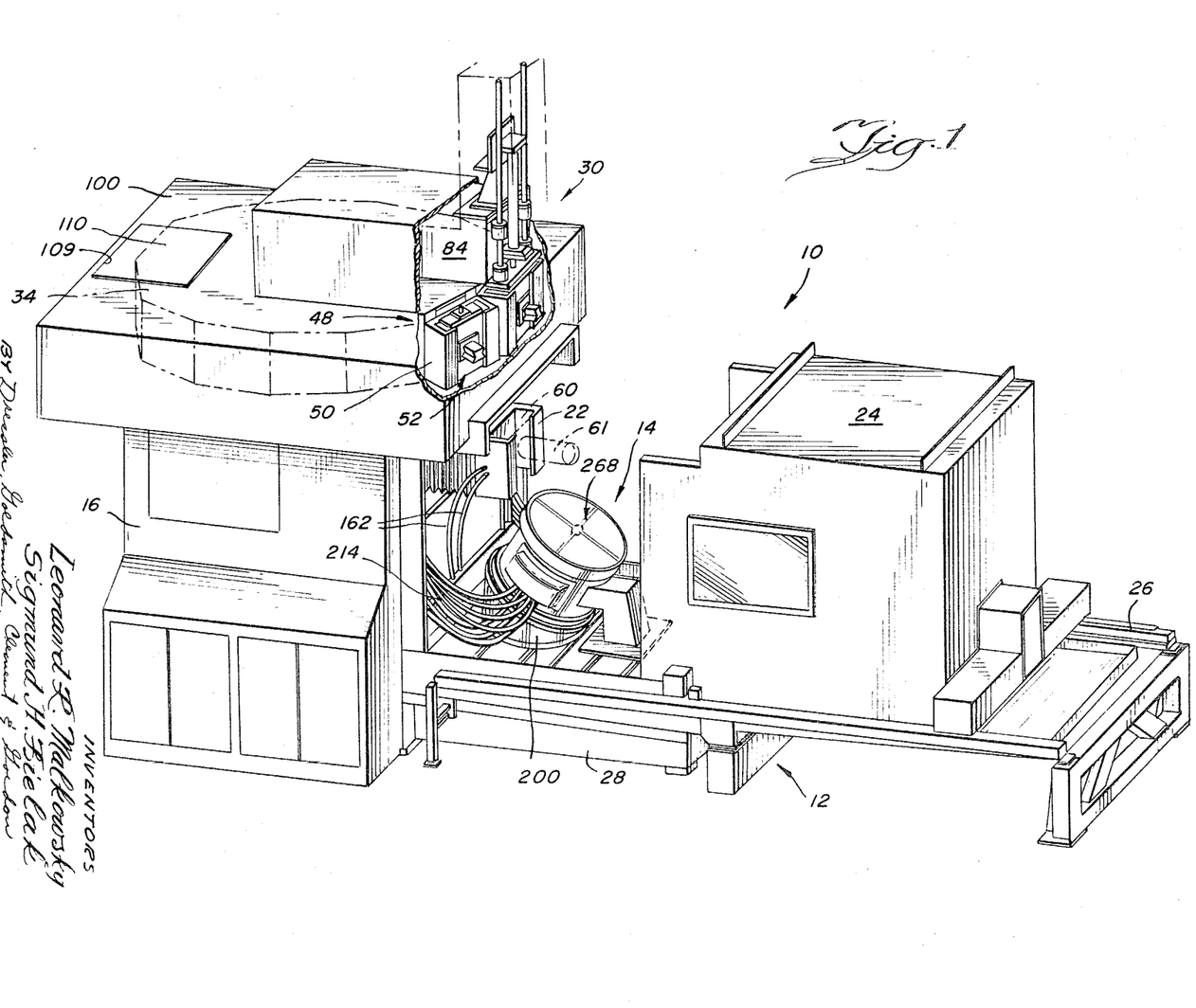
FIG. 1 is a perspective view of an electrochemical machining device having the present invention incorporated therein.
Figure 2:
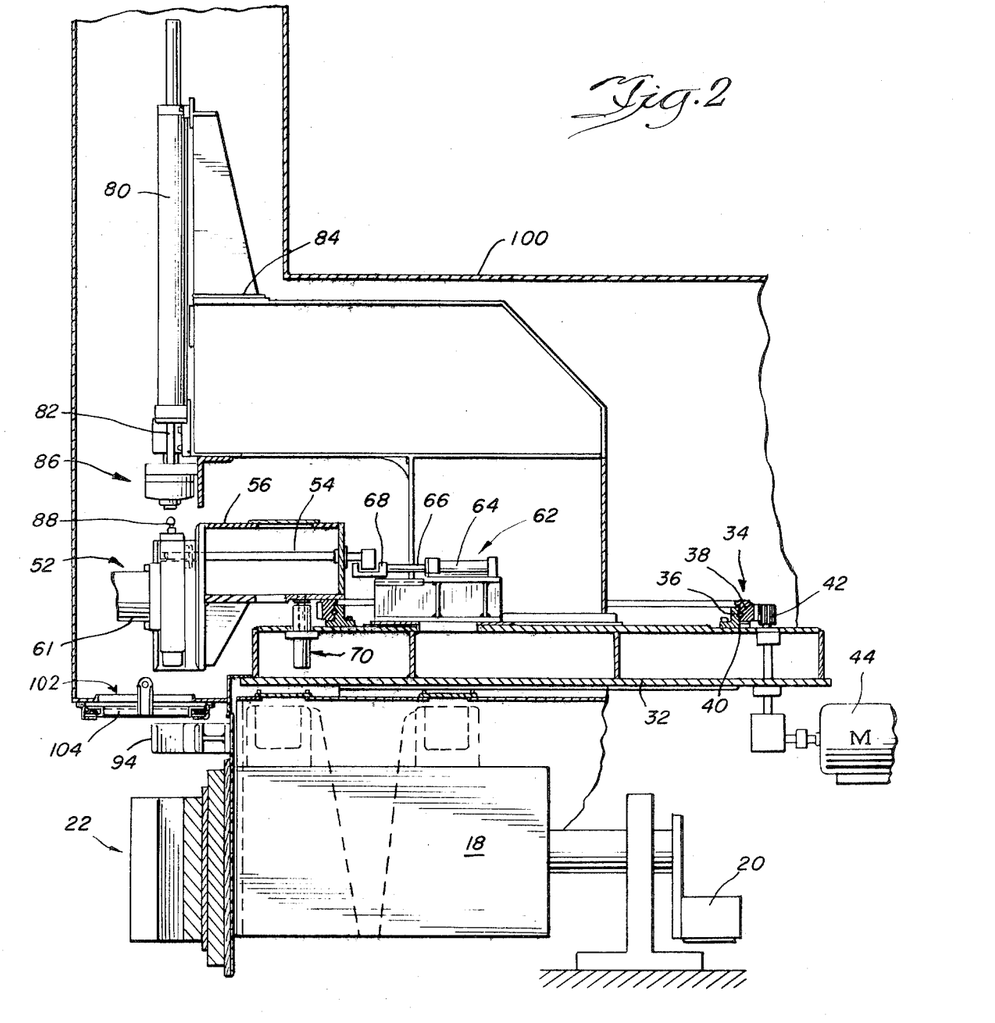
FIG. 2 is a fragmentary vertical sectional view of a portion of the machining device and the tool-changing device constructed in accordance with the present invention.

FIG. 1 of the drawings discloses an electrochemical machining device 10 having the features of the present invention incorporated therein. The electrochemical machining device 10 includes a base 12 fixedly supporting an indexing table 14 for a workpiece (not shown). The machining apparatus further includes a housing 16 enclosing a ram 18 (FIG. 2) which is suitably supported on the base 12 and which is axially shiftable by a motor 20 to move an electrode tool supported in a holder 22 towards and away from the workpiece, in a manner which will become apparent hereinafter.

A movable cover 24 is shiftable on rails 26 defined on the base 12 to enclose the workpiece-indexing table 14 and the electrode tool holder 22 during an electrochemical machining operation. The housing 24 is movable on the rails 26 through suitable drive means which rotates rollers supporting the housing 24 on the rails 26. Located below the indexing table 14 is an electrolyte collection pan 28 which collects the expended electrolyte that is supplied to the electrochemical machining area, in a manner which will become apparent hereinafter.

Figure 3:
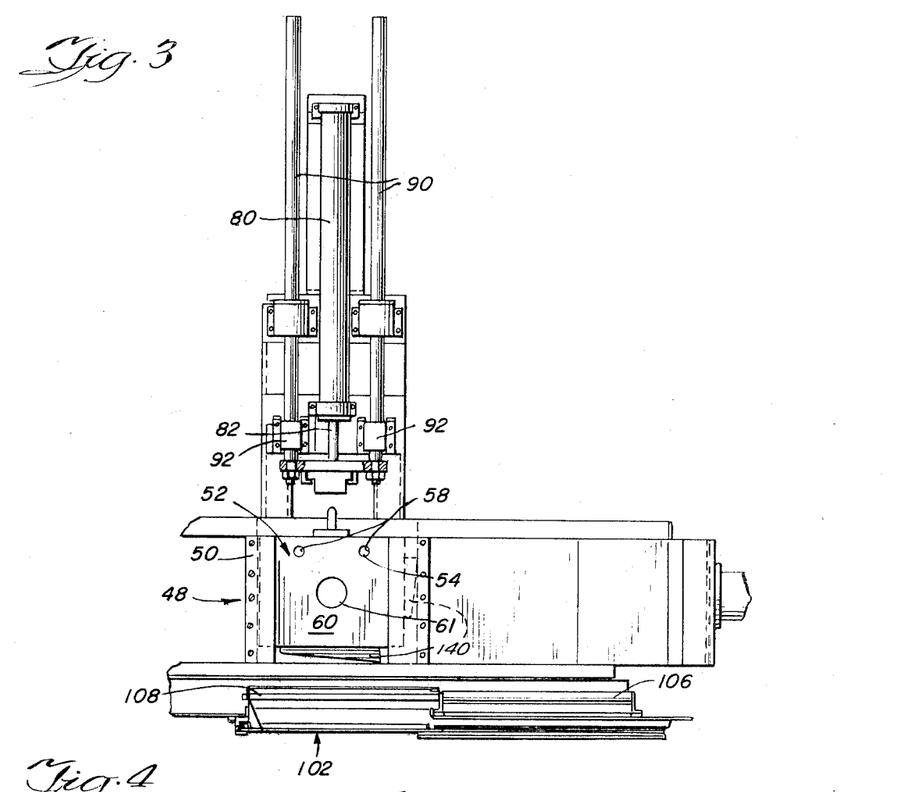
FIG. 3 is a fragmentary end view of the tool-changing device with portions of the cover removed for purposes of clarity.
Figure 4:
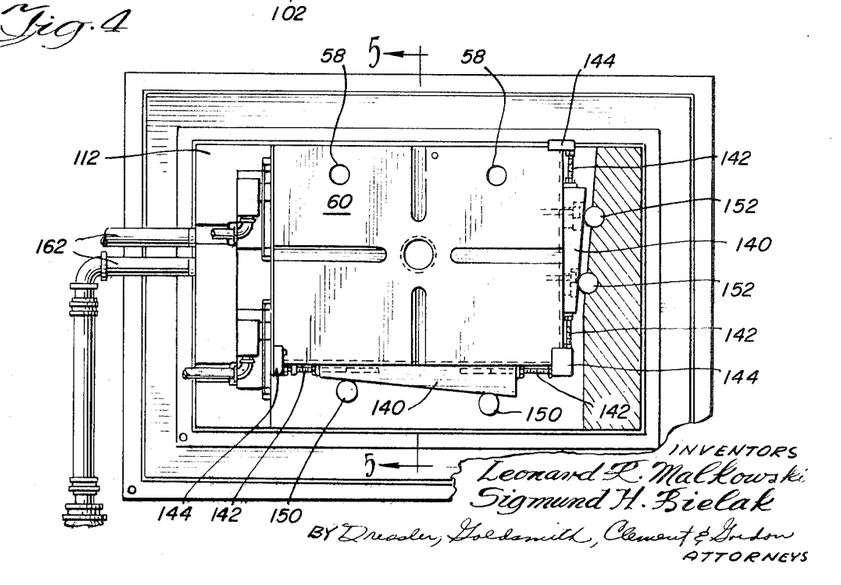
FIG. 4 is an enlarged end view, partly in section, of the tool holder carried by the machining ram.
Figure 5:
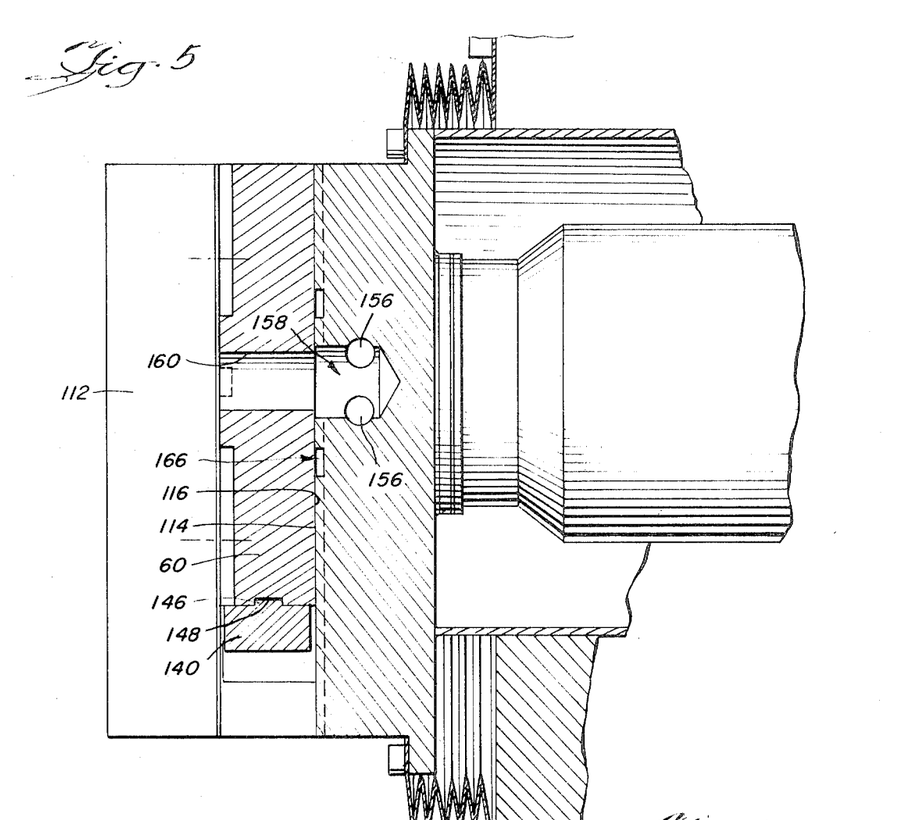
FIG. 5 is an enlarged sectional view taken generally along line 5—5 of FIG. 4.
Figures 6, 7:
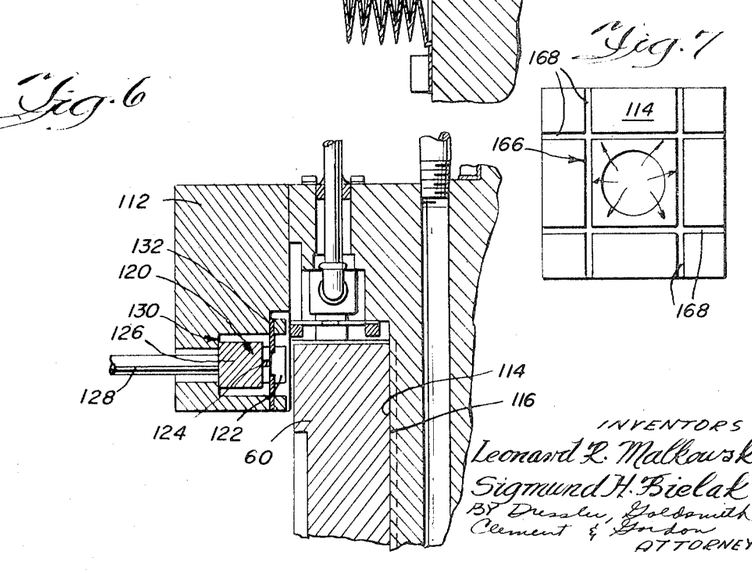
FIG. 6 is an enlarged fragmentary sectional view of the clamping mechanism forming part of the tool holder disclosed in FIG. 4.
FIG. 7 is an end view of the surface of the tool holder.

According to the primary aspects of the present invention, the electrochemical machining device 10 incorporates mechanism for removing and replacing electrode tools which are supported in the holder 22 during a machining operation. The electrode tool-changing mechanism 30 (FIGS. 1–3) includes a base 32 having a table 34 supported for rotational movement thereon. The table 34 is supported on the base 32 through a fixed ring 36 attached to he base and a circular race 38 carried by the table 34 and rotatably supported on the ring 36 through bearings 40. The tool-changing mechanism further includes means for producing relative movement between the base and the table which is illustratively shown as a gear 42 driven by a motor 44 and engaging gear teeth defined on the outer peripheral portion of the race 38.

The tool-changing mechanism further includes a plurality of tool-changing supports 48 which extend outwardly from the table 34 with only two such tool supports being shown in FIG. 1. Each of the tool supports 48 includes a C-shaped guide channel 50 which slidably receives an electrode tool 52, the electrode tool being retained in the guide channel by a latch means. The latch means (FIGS. 2 and 3) comprises a pair of pins 54 mounted for axial movement on the portion 56 of the table 34 which supports the tool support 48. The free ends of the pins 54 are adapted to be moved into and out of openings 58 defined in a platen 60 which forms part of the electrode tool 52. Each platen 60 supports a shaping cathode 61.

The means for releasably retaining the electrode tool 52 in the guide channel 50 further includes a fluid motor 62 consisting of a cylinder 64 fixedly secured to the base 32 and a piston rod 66 having a guide member 68 adapted to cooperate with one end of the pins 54 so as to axially shift the pins in response to extension and retraction of the piston rod 66 within the cylinder 64. Thus, a single cylinder may be utilized for retracting the respective pairs of pins 54 so as to allow the electrode tool 52 to be removed from the guide channel 50 and transferred to the tool holder 22 in a manner which will become apparent hereinafter.

The tool-changing mechanism 30 further includes a loading station defined on the base which locates one of the tool supports 48 in vertical alignment with the tool holder 22 so as to allow removal of the electrode tool 52 from the tool support 48 and place the electrode tool in the holder 22. The loading station for accomplishing the above is defined by lock means 70 which engage the table 34 when an electrode tool is aligned with holder 22 to prevent rotation of the table 34 relative to the base 32 while an electrode tool is transferred between a tool support 48 and the holder 22. The lock means may take any form and is illustrated as a shot pin which is received in openings defined in the table 34 with the shot pin support mechanism being fixedly secured to the base 32.

The tool-changing mechanism further includes means for removing an electrode tool from the tool support aligned at the loading station with the tool holder 22 and placing the electrode tool in the holder. This means includes first and second relatively movable elements in the form of a cylinder 80 having a piston rod 82 slidable therein. The cylinder 80 is fixedly secured to the base 32 by a portion 84 which extends through a central opening defined in the table 34 and has its free end overlying the outer portion of the table 34 which has the tool supports 48 defined thereon.

The free end of the piston rod 82 includes releasable latch means 86 which is adapted to connect the piston rod 82 to the platen 60 while making the transfer between the tool support and the tool holder. The releasable latch means 86 is illustrated as a fluid-actuated collet which is adapted to be connected to a pin 88 that extends above the platen 60. Preferably, the collet 86 is of the type which is floatingly mounted so as to accommodate slight misalignment between the pin 88 and the collet 86.

The collet 86 and piston rod 82 are guided for movement along a straight line path by a pair of rods 90 slidable in collars 92 that are supported on the end surface of the base portion 84. An additional fixed guide 94 is located directly above the retracted position of the holder 22 (FIG. 2) to insure that the platen 60 is received into the holder.

The tool-changing mechanism 30 further includes means for sealing the mechanism from the electrochemical machining device while a machining operation is being performed. The sealing means is necessary to prevent the electrolyte from entering the relatively movable parts of the tool-changing mechanism during a machining operation. The sealing means is in the form of a housing 100 which completely encloses the base 32, the table 34, and the fluid motor, including the piston rod 82 and cylinder 80. The sealing means or housing 100 has an opening 102 at the loading station with the opening being located below the tool support aligned with the holder 22 at the loading station.

The opening 102 is adapted to be sealed during a machining operation by a door 104 which is movable between open and closed positions by a drive means in the form of a cylinder 106 attached to the housing 100 and a piston rod 108 slidable in the cylinder 106 and connected to the door 104. A labyrinth seal is provided between the housing and the door to prevent electrolyte from penetrating any space which may be left between the door and the housing during the machining operation. The housing also has a second opening 109 remote from opening 102 which allows access to tool-changing mechanism to remove and replace electrode tools. The opening 109 may be closed by a cover 110.

According to another aspect of the invention, the holder 22 is designed to automatically accommodate removal and replacement of the electrode tool after a machining operation has been performed. For this purpose, the tool holder, which is shown in detail in FIGS. 4–7, includes a C-shaped guide channel 112 which is fixedly secured to he free end of the ram 18. The guide means or C-shaped channel 112 has a first contact surface 114 defined thereon which cooperates with a second surface 116 defined on the platen 60 to produce an electrical current flow path and an electrolyte flow path between the holder and the platen during a machining operation, as will become apparent hereinafter.

The means for accommodating automatic removal and replacement of the electrode tool in the holder further includes clamping means which releasably retain the electrode tool in the guide channel or guide means 112 during a machining operation. This clamping means is more particularly shown in FIG. 6 and includes a plurality of clamping members 120, all of which are carried by the C-shaped guide channel and which produce engagement between the cooperating surfaces 114 and 116 to provide a current flow path between the conductive metal platen 60 and the conductive metal guide member 112. Four such clamping members are shown for producing the contacting engagement between the cooperating surfaces 114 and 116 during a machining operation, with a pair of clamping members 120 carried by each of the legs overlying the web of the C-shaped guide channel 112. Additionally, the locking means further includes a pair of clamping members 120 carried by one outwardly extending leg of the guide channel 112 to produce an appropriate transverse locking and alignment between the cooperating surfaces in a unique manner which will be described in more detail hereinafter.

Each of the clamping members 120 includes a pad 122 adapted to engage the platen 60 with the pad being supported on the free end of a piston rod 124 slidably within a cylinder 126 and movable between engaged and disengaged positions by pressured fluid being supplied to the cylinder through a conduit 128. The cylinder 126 is preferably located within a recess 130 defined in the guide channel 112 and the entire mechanism is sealed from the electrolyte through a diaphragm 132.

According to a further aspect of the present invention, the electrode tool 52 and more particularly the platen 60 has adjustable means supported thereon which cooperate with the guide means 112 to accurately position the platen 60 and shaping cathode 61 relative to the holder 22.

More specifically, the adjustable means includes a pair of wedge-shaped elements 140 (FIG. 4) respectively cooperating with adjacent edges of the polygonal platen 60 with each of the wedge-shaped elements being movable relative to an associated edge of the platen. The moving means for each of the wedge-shaped elements 140 includes a pair of threaded rods 142 respectively cooperating with each end of the wedge-shaped element and each having a free end threadably received in respective blocks 144 supported on the platen. Each wedge-shaped element 140 also has a tongue 146 slidably supported in a groove 148 defined in the associated edge so as to maintain an accurate positioning between the platen 60 and the element 140.

The inclined surfaces of the respective wedge elements 140 respectively cooperate with spaced contact points defined on the platen holder and more particularly on the C-shaped guide member 112. The spaced contact points for the first wedge element are defined by spaced rollers 150 extending from the surface 114 and fixedly secured thereto as by bolts. The second wedge-shaped element 140 cooperates with spaced contact points defined by fixed pins 152 located adjacent the vertical extending portion of the C-shaped guide channel, as is more clearly shown in FIG. 4.

Thus, the adjustment of the wedge-shaped elements will accurately position the platen 60 both vertically and horizontally relative to the two adjacent contact areas defined on the holder 22. Thereafter, actuation of the respective clamping members 120 will securely lock the platen 60 and, therefore, the cathode 61 relative to the holder 22. It will be appreciated that the spaced contact points defined on the holder 22 which cooperate with the wedge-shaped elements 140 are necessary to allow for the material which is removed from the workpiece during a machining operation to fall through and prevent buildup of this material in the holder 22.

As was indicated above, the surfaces 114 and 116 cooperate with each other to provide a current flow path between the conductive metal member forming the holder 22 and the shaping cathode 61, as well as the electrolyte flow path to the shaping cathode. The electrolyte flow path (FIGS. 4 and 5) consists of a pair of spaced bores 156 extending from one edge of the webs of the guide member 112 and communicating at its inner end with a recess or bore 158 extending from the surface 114. The flow path further includes an opening 160 extending through the platen 60 and terminating at the surface 114 with the opening 160 axially aligned with the bore 158 when the electrode tool is received in the holder 22. The opposite end of the bore or opening 160 will cooperate with an opening (not shown) defined is the shaping cathode to provide a flow path for the electrolyte to the gap or space defined between the shaping cathode and the workpiece during a machining operation. The outer ends of the bores 156 are connected to a supply of electrolyte under pressure through conduits 162. It should be noted that the primary reason for supplying two bores is to compensate for the extreme operating pressures of the electrolyte during a machining process. It will, of course, be appreciated that any number of such conduits and bores may be provided to supply electrolyte to the bore 158.

The electric current is supplied to the shaping cathode through a bus bar (not shown) connected to the back surface of holder 22 with the holder and the platen being of current-conducting material and the surfaces 114 and 116 cooperating to complete the current flow path.

The extreme operating pressure of the electrolyte during a machining operation will have a tendency for escaping between the cooperating surfaces 114 and 116 and would cause a sufficient buildup of force from the escaping electrolyte that would tend to push said cooperating surfaces apart and break the electrical contact between them during a machining operation. In order to prevent such a buildup of forces which would tend to push the cooperating surfaces apart and break the electrical contact between them, one of the cooperating surfaces, e.g., the surface 114, has a continuous recess 166 surrounding the electrolyte flow path with the recess being spaced from the peripheral edge of both of the surfaces 114 and 116. The continuous recess 166 communicates with the space surrounding the contact surfaces 114 and 116 through continuations 168 of the recess 166. In order to simplify the construction for production of the recesses in the surface 114, the continuous recess 166 is formed by first and second pairs of spaced parallel recesses which intersect each other and which terminate on opposite ends at the edges of the surface 114.

During a machining operation, the recess 166 will channel away any electrolyte that escapes from the flow path, defined by openings 158 and 160, into the space between the surfaces in the immediate vicinity of the flow path so that the peripheral portion of the cooperating surfaces 114 and 116 will have sufficient contacting engagement to produce an electrical current flow path between the tool and the tool holder. Stated another way, the recess 166 substantially reduces the surface area of the cooperating surfaces which are subjected to the pressure of the electrolyte to thereby accommodate the extreme pressures of the electrolyte and still maintain sufficient contact for producing an electrical flow path across the surfaces.

According to a still further aspect of the present invention, the electrochemical machining device of the present invention includes an indexing table for supporting the workpiece adjacent the holder with the indexing table being capable of being rotated relative to the position of the holder 22 thereby exposing different portions of the workpiece to the shaping cathode supported within the holder. The workpiece-supporting table or member is capable of being rotated an infinite amount relative to a fixed support or pedestal and the source of electrical current is connected to the movable portion of the table in a manner to allow the infinite movement without the necessity of having the operator physically remove the connection of the electrical current source from the indexing mechanism. More specifically, the current-conducting cables are connected to the rotational axis for the workpiece-supporting member by releasable clamp means which can be remotely controlled to allow release and clamping of the cables and rotation of the work supporting member by appropriate manipulation of control devices which are located outside of the machining area. Also, the rotatable portion of the indexing table or the workpiece supporting member is isolated from the remainder of the apparatus so that only a small portion of the device needs to be energized to make the workpiece anodic.

Figures 8, 9:
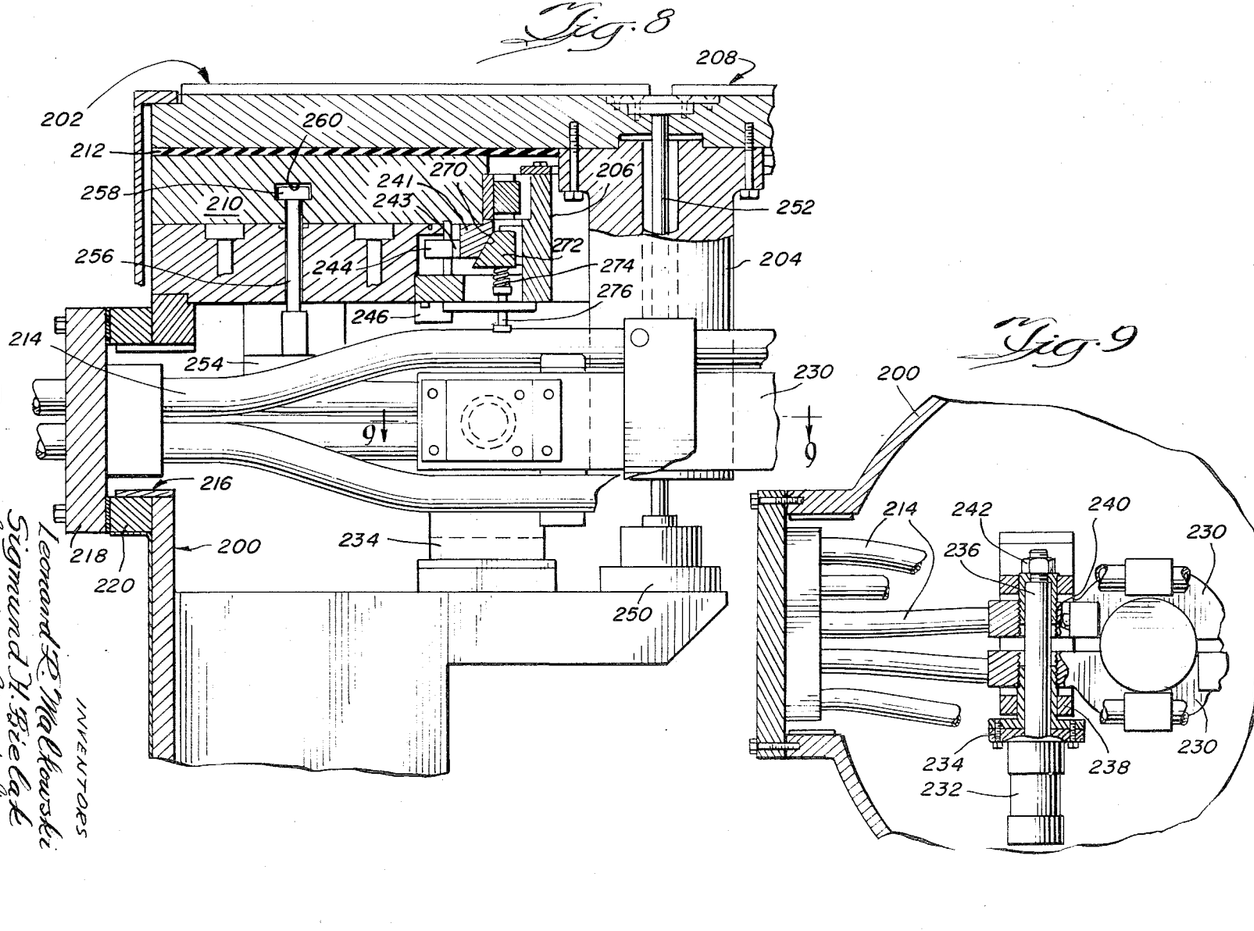
FIG. 8 is an enlarged fragmentary sectional view of the workpiece indexing table of the present invention.
FIG. 9 is an enlarged fragmentary sectional view taken generally along line 9—9 of FIG. 8.

As more clearly shown in FIGS. 8 and 9, the indexing table for supporting the workpiece includes a support or pedestal 200 which extends above the base 12 of the electrochemical machining device 10. A workpiece supporting member 202 is rotatably supported on the pedestal 200 and has a shaft 204 extending through an opening 206 defined in the upper portion of the pedestal 200 with the shaft 204 defining the rotational axis for the workpiece supporting member 202. As more clearly shown in FIG. 1, the upper surface of the workpiece-supporting member has keyways 208 defined therein for fixedly securing the workpiece thereon.

The workpiece-supporting member is connected to a ring 210 and the supporting member 202 and ring 210 are separated by noncurrent conductive means 212 which completely isolate the workpiece-supporting member and the shaft from the remainder of the indexing table.

A source of electrical current is supplied to the current-conducting shaft 204 and the current-conducting support member 202 through a plurality of cables 214 which extend through an opening 216 defined in the pedestal 200. All of the cables have electrical current supplied thereto from an external source through a junction 218 which is is isolated from the remainder of the pedestal through insulating material 220.

The free ends of the respective cables 214 are connected to the shaft 204 through releasable clamping means in the form of a pair of jaws 230 which are disposed on opposite sides of the shaft 204. The ends of the respective jaws 230 are adapted to be moved towards and away from each other by a pair of fluid rams each having its cylinder 232 (only one is shown in the drawings) supported on a bracket 234 extending from the lower portion of the pedestal 200 with respective ends of the first jaw being fixedly secured to the respective cylinders 232. Each piston rod 236 of the fluid rams extends through a bushing 238 defining the connection between the cylinder 232 and the first jaw 230. The piston rods are fixedly connected to the ends of the second jaw 230 through second bushings 240 and a suitable connecting member such as a nut 242.

Thus, extension and retraction of the piston rods or first movable elements relative to the cylinders or second movable elements will move both jaws 230 away from the shaft 204. This will allow for relative rotation of the shaft 204 with respect to the current-conducting connecting means and allow for a reconnection of the current-conducting means or cables 214 after the desired rotation of shaft 204 and workpiece-supporting member 202 has been accomplished.

The indexing table for supporting the workpiece further includes drive means for rotating the workpiece-supporting member 202 and shaft 204 relative to the base or pedestal 200. In the illustrated embodiment, the drive means includes a circular member 241 extending from the lower surface of the ring 210 with teeth 243 defined on the peripheral surface of the member 241. A gear 244 driven by a motor 246 supported on the pedestal 200 will cause relative rotation of the work-supporting member 202 with respect to the support or pedestal 200.

If desired, a rotary pulse generator readout device 250 may be connected to a small shaft 252 fixedly secured to the work-supporting member 202 to give a precise readout of the angular position of the work-supporting member 202 relative to the pedestal 200.

Also, it is desirable to provide clamping means for fixedly securing the ring 210 and the workpiece-supporting member 202 relative to the pedestal 200 after the workpiece-supporting member has been rotated to a desired position. This is accomplished by fluid rams having the cylinders 254 (only one being shown) fixedly secured to the pedestal 200 and the piston rods 256 extending through openings in the pedestal 200 with the free end of the piston rods 256 having enlarged portions 258 received in a circumferential slot 260 defined in the ring 210. Thus, retraction of the piston rod within the cylinder will clamp the ring 210 and the work-supporting member 202 onto the pedestal 200. It may also be desirable to provide airlift devices which are known in the art to provide a cushion of air between the ring 210 and the pedestal 200 to permit easy rotation of the workpiece-supporting member 202 and the ring 210.

The indexing table for the workpiece further includes means for maintaining the shaft 204 and the workpiece-supporting member 202 centrally positioned relative to the pedestal 200. In the illustrated embodiment, this means includes an inclined surface 270 defined on the member 241 and cooperating with a similarly inclined surface on a ring 272 which is spring biased up upwardly by springs 274 supported on the pedestal 200 by bolts 276. This arrangement will not only maintain the work-supporting member in a central position relative to the pedestal, but will also act as a friction drag brake to prevent any possible overtravel of the work supporting member.

OPERATION

The operation of the electrochemical machining device as constructed in accordance with the present invention is believed to be apparent from the above description. However, a brief summary of the operation will now be described. A workpiece is fixedly secured to the upper surface of the supporting member 202 and the supporting member is rotated to a desired angular relation relative to the support or pedestal 200 so as to locate the surface of the workpiece desired to be machined in alignment with the shaping cathode supported in the holder. Once the proper angular position of the work-supporting member has been achieved, pressured fluid is supplied to the head end of the pair of cylinders 232 to fixedly clamp the jaws 230 into engagement with the shaft 204 thereby connecting the current-conducting cables 214 to the shaft 204 as well as to the work-supporting member 202 and to the workpiece. Pressured fluid is also supplied to the cylinder 254 to clamp the ring 210 and table 202 to the pedestal 200.

Thereafter, the electrode tool, which is designed to be utilized at this point, is moved to the loading station by rotation of the table 34 relative to the base 32. The door 104 is opened by supplying pressured fluid to the rod end of cylinder 106 and pressured fluid is supplied to the head end of the cylinder 80 to cause engagement of the collet 86 with the pin 88. The collet 86 is then clamped to the pin 88 by supplying pressured fluid to a cylinder (not shown) in the collet.

Subsequently, a small amount of pressured fluid is supplied to the rod end of the cylinder 80 to raise the electrode tool, including platen 60 and shaping cathode 61, an amount sufficient to allow retraction of the pins 54. The pressured fluid is then supplied to the rod end of cylinder 64 to cause a retraction of piston rod 66 thereby retracting pins 54 to accommodate relative movement of the electrode tool and the guide channel 50.

Pressured fluid is then again supplied to the head end of cylinder 80 to move the electrode tool 52 downwardly through the guide member 94 and into the holder 22. When the lower wedge-shaped element 140 engages the stops 150, the supply of pressured fluid to the cylinder 80 is discontinued and the collet 86 is released from pin 88. Pressured fluid is then supplied to the respective clamping members 120 to fixedly secure the electrode tool within the holder 22. The piston rod 82 is then retracted and the door 104 is closed. The cover 24 is subsequently moved to a closed position to enclose the machining area.

A flow of electrolyte under pressure is then supplied to the electrolyte flow path and a source of energy is supplied to the bus bar, the electrode tool, and the workpiece to make the workpiece anodic and the electrode tool cathodic. The electrode tool and holder are thereafter moved towards the workpiece by the ram 18 to perform the necessary machining operation on the workpiece.

After the machining operation with the selected electrode tool has been completed, the holder and the selected electrode tool are retracted to a first position and the electrode tool is removed through the fluid ram and located in the tool support. The tool-changing table is then rotated to place another electrode tool in alignment with the tool holder 22 at the loading station. The subsequently selected electrode tool is then located in the holder in the manner described above and a further machining operation is accomplished.

If it is desired to perform an electrochemical machining operation at a different peripheral point on the workpiece, it is only necessary for the operator to release the clamping jaws 230 and clamps 258, rotate the workpiece-supporting member 202 the desired amount, and clamp the jaws 230 onto the shaft 204 and ring 210 to base 200.

As can be appreciated from the above description, the present invention allows for the operator to perform a plurality of machining operations by mere manipulation of control devices which may be remotely located so as to eliminate the need of the operator to completely shut down the operation of the machine and to physically replace the electrode tool or to rearrange the workpiece relative to the relatively movable tool.

The present invention further contemplates that the entire operation may be automatically performed by controlling the movement of the electrode tool changing device, the transfer of the electrode tool between the tool-changing device and the holder and the rotational movement of the indexing table for the workpiece through suitable automatic control mechanism. Such control mechanism may take the form of a tape control system, a digital control system or a computerized control system.

In any such operation, it is desirable to provide a certain sequence of events to insure that the operation of the electrochemical machining device may not be performed in a manner to cause destruction of the machine. Thus, there will be briefly described a simplified control system for controlling the tool-changing mechanism in the desired sequence of operation.

The illustrated control circuit is in the form of electrically actuated hydraulic control devices which cause actuation in the prescribed manner of the various elements. However, it will be appreciated that the control devices may take many different forms and the electrical and fluid circuits incorporated into the system may be replaced by other types of devices.

Figure 10:
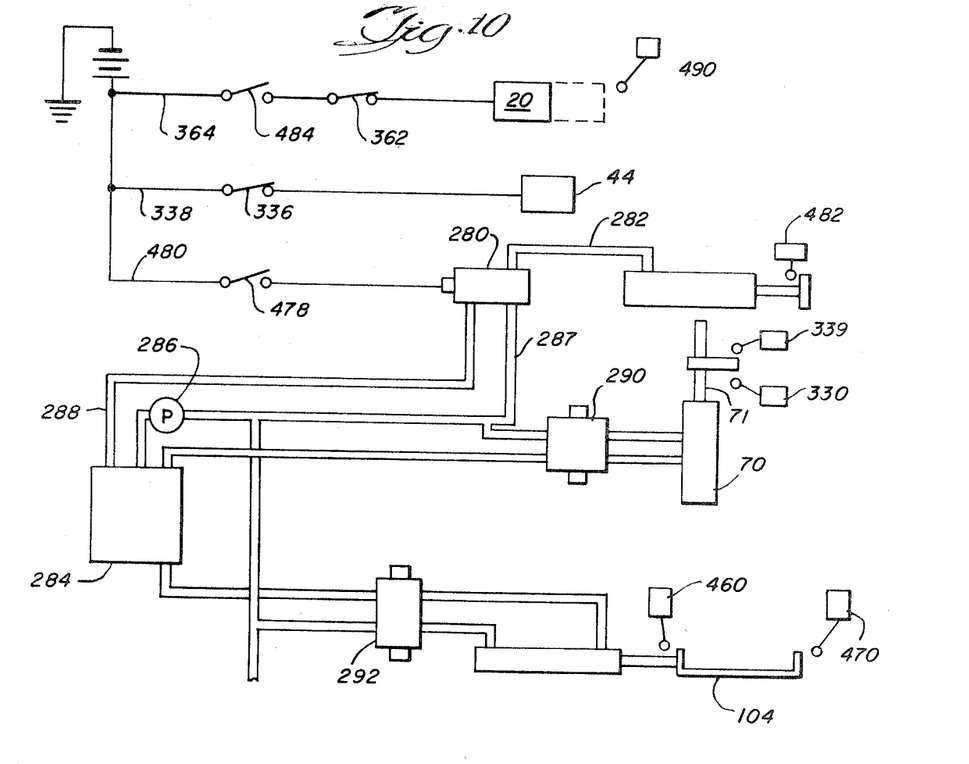
FIG. 10 is a fragmentary schematic of a portion of an illustrative hydraulic and electric circuit for automating the tool changing device of the present invention.
Figure 11:
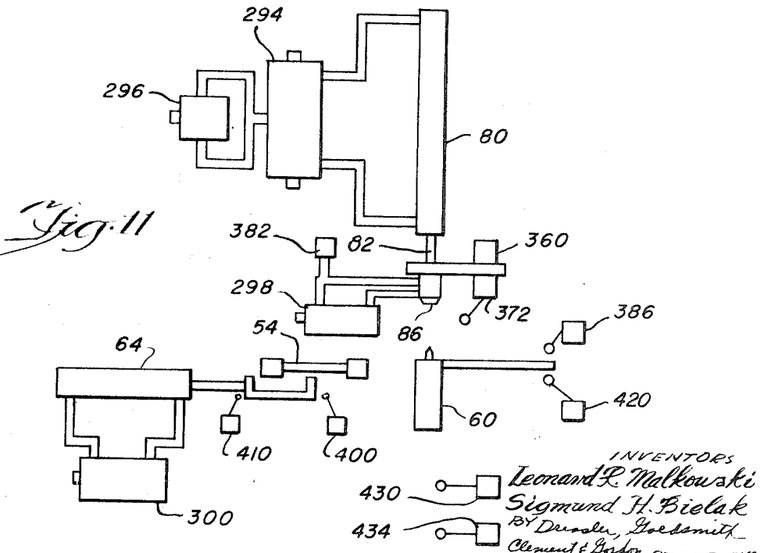
FIG. 11 is a schematic illustration of the remainder of the hydraulic circuitry for automating the tool-changing device.
Figure 12:
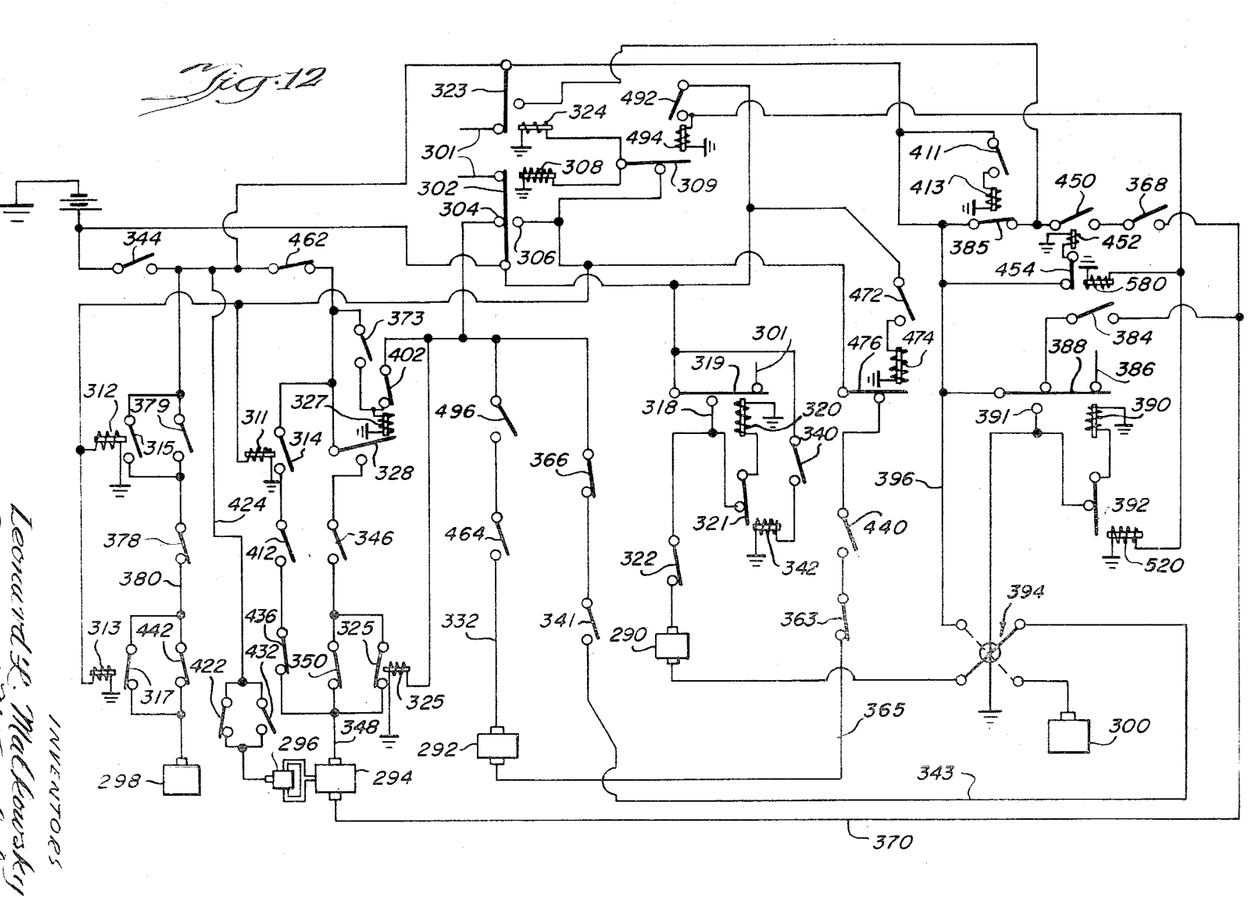
FIG. 12 is a schematic illustration of the remainder of the electrical circuitry for automating the tool-changing device.

The illustrated control circuit is disclosed in FIGS. 10, 11 and 12 with FIGS. 10 and 11 disclosing the hydraulic circuitry for supplying pressured fluid to the various fluid rams while portions of FIG. 10 and FIG. 12 disclose the electrical circuitry for actuating the various valves. As illustrated in FIG. 10, the hydraulic control circuitry includes a three-way solenoid-operated valve 280 for supplying pressured fluid to the respective clamping mechanisms 120. Pressured fluid is supplied from a reservoir 284 through a pump 286 and conduit 287 to the valve 280 while the valve is exhausted to the reservoir through conduit 288.

The supply of pressured fluid from the source 284 to the table-indexing cylinder 70 to extend and retract piston rod 71 is controlled by a two-spool, four-way, solenoid-operated valve 290 commercially available from Affiliated Control Equipment Company and sold as a Pneucon No. C470DPOC. The control of the flow of pressured fluid to opposite ends of the door cylinder 106 to open and close the door 104 is controlled through a two-spool, four-way, solenoid valve 292.

The remainder of the hydraulic control circuit includes an additional two-spool, four-way, solenoid valve 294 which controls the supply of fluid to and from the fluid ram or cylinder 80 with an additional four-way solenoid-operated valve 296 interposed between the source of fluid 284 and the valve 294 to produce either a restricted flow or substantially unrestricted flow to the cylinder 80. The supply of pressured fluid to the collet 86 is controlled with a four-way solenoid-operated valve 298 while the supply of pressured fluid to and from the pin-retracting cylinder 64 is controlled through an identical valve 300.

Assuming that the tool-changing mechanism 30 is in the indexed position, the door 104 is open, and an electrode tool is desired to be transferred from the tool support 48 to the tool holder 22, the operation is initiated by pushing a button 301 which actuates a switch 302 to interrupt the power supply to contact 304 and supplies power to contact 306. The switch 302 is latched in the new position by a solenoid 308 energized through switch 309. The energization of contact 306 will energize solenoids 311, 312 and 313. Solenoid 311 closes switch contacts 314 in the collet-lowering circuit 348 while solenoids 312 and 313 will respectively close contacts 315 and open contacts 317 in the collet-clamping circuit 380.

Actuation of the button 301 also energizes contact 318 through a switch 319 which is latched in the closed position through a solenoid 320 and a switch 321. Closure of the switch 319 in the shot pin raising circuit will complete the circuit through a closed switch 322 to the valve 290 to supply pressured fluid to the head end of cylinder 70 and lock the table 34.

Actuation of the button 301 will also close switch 323 which is also latched in the closed position through a solenoid 324 energized through the switch 309, for a purpose which will be described hereinafter.

Deenergizing contact 304, forming part of the two position switch 302, will deenergize solenoid 326 and open contacts 325 in the collet-lowering circuit 348 and will deenergize solenoid 327 and allow switch 328, in the collet-lowering circuit, to close. Deenergizing contact 304 will also interrupt the circuit to one side of the valve 292 to prevent energizing both sides of valve 292 when closing the door in a later operation.

The movement of the piston rod 71 in the cylinder 70 to its extended position will release a switch 330 disposed in the path of an arm extending from the piston rod which in turn will open contacts 336 in a table drive circuit 338 supplying power to the table drive motor 44. This will prevent energizing the table drive while a platen is being transferred from the tool-changing mechanism to the tool holder. The release of switch 330 will also close contacts 341 in the shot pin release circuit 343.

The extension of the piston rod 71 to its fully extended position will depress or close a switch 339 disposed in the path of the arm extending from the piston rod. Switch 339 will open contacts 322 to interrupt the shot pin raising circuit and will close switch contacts 340 to energize solenoid 342. Energizing solenoid 342 will open switch 321 interrupting the supply of power to the solenoid 320 to allow the switch 318 to move to its open position and condition the circuit to the shot pin valve 290 for a subsequent operation.

Switch 339 also closes contacts 344 in the main circuit to the platen transfer system and closes contacts 346 in the collet-lowering circuit 348. The closure of these contacts and previously closed switch 328 in the collet-lowering circuit 348 completes the circuit to one side of the valve 294 to move the collet 86 towards the platen 60.

The downward movement of the collet 86 will release switch 360 which in turn will open contacts 362 in a ram drive circuit 364 (FIG. 10) leading to the drive motor 20 and prevent any movement of the ram while the platen is being transferred from the tool support to the tool holder. The release of switch 360 will also open contacts 363 in the door-opening circuit 365 leading to valve 292 to prevent the door 104 from being closed while the platen is being transferred to the tool holder. Also, the release of switch 360 will open contacts 366 in the shot pin lowering circuit 343 and will close contacts 368 in a collet-raising circuit 370 leading to the opposite end of the collet control valve 294.

When the collet has reached the position for connection to the pin 88, a switch 372, carried by the collet support, is depressed to close a contact 373 in a circuit leading to the solenoid 327 and open the switch 328 in the collet-lowering circuit 348 thereby interrupting the downward movement of the collet 86. The switch 372 simultaneously closes contacts 378 in a collet-clamping circuit 380 leading to valve 298 to supply a pressured fluid to the collet 86 and clamp the pin 88 within the collet 86. When the collet is clamped, a pressure switch 382 is actuated which in turn closes contacts 384 to complete the collet-raising circuit 370 to the valve 294 and cause an upward movement of the platen 60. The pressure switch also opens switch contacts 385 in the collet-raising circuit 370 to condition the circuit for a subsequent operation.

Upward movement of the platen 60 will depress a further switch 386, disposed in the path of an arm connected to the platen, which mechanically opens switch 388 in the collet-raising circuit 370 thereby stopping the upward movement of the collet and the platen. The opening of the switch 388 energizes a contact 391 to energize solenoid 390 through a switch 392 and maintain the switch 388 in the second position. The energization of contact 391 also energizes a stepping switch 394 which moves the switch 394 to a second position completing a circuit 396 to the valve 300 to cause a retraction of the pins 54 from the platen 60. The movement of the stepping switch to the second position will also interrupt the shot pin lowering circuit 343 to the valve 290 controlling the supply of pressured fluid to the cylinder 70, for a purpose which will be described later.

Initial retraction of the pins 54 will release a switch 400 which will open switch contacts 402 in the collet-lowering circuit 348 to condition the circuit for a subsequent operation. The switch 400 will also close contacts 379 in the collet-clamping circuit 380 to condition the circuit for a subsequent operation. When the pins 54 reach the fully retracted position, a second switch 410 is actuated which closes contacts 412 in the collet-lowering circuit 348 leading to one side of valve 294 to energize the valve and cause a downward movement of the piston rod 82 and the platen 60. The actuation of switch 410 also closes contacts 411 to energize solenoid 413 associated with contacts 385 to mechanically latch the contacts 385 in the open condition. The downward movement of the platen 60 will release the switch 386 but the solenoid 390 in the collet-raising circuit 370 remains energized to maintain the switch 388 in its previous condition.

The downward movement of the platen 60 will open switch 420 disposed in the path of the arm carried by the collet which will open switch contacts 422 in a circuit 424 leading to the speed control valve 296 to deenergize the valve and produce substantially unrestricted flow to the head end of the cylinder 80 thereby increasing the speed of travel of the platen towards the tool holder.

When the platen reaches the tool holder 22, a further switch 430, disposed in the path of the platen, is actuated to close contacts 432 in the circuit 424 leading to valve 296 to energize the valve and reduce the flow of pressurized fluid to the cylinder 80 thereby decreasing the speed of travel of the platen as it enters the tool holder 22.

When the platen is received in the tool holder 22, a further switch 434 is actuated to open contacts 436 in the collet-lowering circuit 348 leading to the valve 294 to interrupt the downward travel of the platen. The closure of switch 434 also closes contacts 440 in the door closing circuit 365 leading to valve 292 and opens contacts 350 in the circuit 348 leading to valve 294. The closure of contacts 440 will condition the circuit 365 for a subsequent operation while the opening of contact 350 will condition the circuit 348 for a subsequent operation. The actuation of switch 434 also opens contacts 442 in the collet-clamping circuit 380 which will deenergize the valve 298 and release the collet-clamping mechanism 86.

Release of the pressure on the collet 86 will open pressure switch 382 which in turn opens contacts 384 in he circuit 370 to the valve 294 to condition this portion of the circuit for a subsequent operation. It should be noted that switch contacts 385, which were previously opened when the pressure switch 382 was actuated, remain in the open condition by the continued energization of solenoid 413 through closed contacts 411.

The closure of switch 434, by the platen 60, will also close switch 450 in The collet-raising circuit 370 to the valve 294 and will complete this circuit through the previously closed switch 323 and the switch contacts 368. The switch 450 will be maintained in the closed position through solenoid 452 which is energized through switch 454.

The movement of the collet 86 away from the platen 60 will release switch 372 to open contacts 373 and deenergize solenoid 327 in the collet-lowering circuit 348. The deenergization of solenoid 327 will close switch 328 to condition the circuit 348 for a subsequent operation. The release of switch 372 will also open contacts 378 in the collet-clamping circuit 380 to condition this circuit for a subsequent operation.

The upward travel of the collet 86 will release switch 430 which will open switch contacts 432 in the circuit 424 to shift the speed of travel of the collet to the higher of the two speeds. The upward travel of the collet 86 will depress switch 420 which closes switch contacts 422 to reduce the speed of travel of the collet as it is returning into the retracted position. When the collet 86 reaches its fully retracted position, switch 360 is actuated, which closes contacts 362 in the ram drive circuit 364, to condition the circuit for a subsequent operation. Closure of the switch 360 will also close contacts 366 in the circuit 343 leading to the table-locking valve 290. The switch 360 will also open switch contacts 368 in the collet-raising circuit 370 to stop the upward movement of the collet and will simultaneously close contacts 363 in the door-closing circuit 365 to complete said circuit to the valve 292 to cause a closing of the door. As the door 104 begins to close, switch 460 is opened which will open contacts 462 in the collet-lowering circuit 348 and the door-closing circuit to prevent the collet from being lowered while the door is in the closed position. Switch 460 will also close contacts 464 in the door-closing circuit 332 to condition said circuit for a subsequent operation.

When the door 104 reaches the fully closed position, switch 470 will be closed and will close contacts 472 to energize solenoid 474 and open switch 476 in the door-closing circuit 365 to stop the movement of the door. Closure of switch 470 will also close contacts 478 in the platen-clamping circuit 480 leading to valve 280 to lock the platen within the platen holder 22. The closure of the clamps 120 will release a switch 482 disposed in the path of one of the clamps which in turn will close contacts 484 in the ram drive circuit 364 to start movement of the platen for a machining operation.

When a machining operation has been completed and the ram reaches its fully retracted position, switch 490 will be depressed and momentarily close momentary contact switch 492 to temporarily energize solenoid 494 and open switch 309. The opening of switch 309 will deenergize solenoids 308 and 324 to allow the switches 302 and 323 to move to the initial position. After the switches 302 and 323 have moved to the initial position, the switch 309 will be released and will energize solenoids 308 and 324 for a subsequent operation. The actuation of switch 490 will also close contacts 496 in the door opening circuit, for a purpose which will be described later.

The momentary closure of switch 492 will energize solenoid 520 cooperating with switch 392 and will thus deenergize solenoid 390 cooperating with switch 388 to allow he switch to move to its initial position. This will open the circuit to the stepping switch 394 to condition the circuit for subsequent operation and will also condition the collet-raising raising circuit 370 for a subsequent operation. The deenergization of contact 306 associated with switch 302 will deenergize the relays 312 and 313 to cause a closing of switch contacts 317 and an opening of switch contacts 315 in the collet-clamping circuit 380. The deenergization of contact 306 will also deenergize solenoid 311 and allow switch contacts 314 in the collet-lowering circuit 348 to open. The movement of the switch 302 to its initial position will energize contact 304 which in turn will energize solenoid 326 associated with contacts 325 in the collet-lowering circuit to condition the circuit for a subsequent operation.

The closure of contacts 496 in the door-opening circuit 332, by actuation of switch 490, will cause the door 104 to begin opening. The beginning opening movement of the door 104 will release switch 470 which will open contacts 472 and deenergize relay 474 to close switch 476 and condition the door-closing circuit for a subsequent operation.

The release of switch 470 will also open contacts 478 in the clamping circuit 480 to release the clamps 120. The release of the clamps 120 will open switch 482 to open contacts 484 in the ram circuit 364 to prevent energization of the motor 20 while the transfer of the platen is being made.

When the door reaches its fully opened position, switch 460 is actuated to open contacts 464 in the door-opening circuit 332 to the valve 292 to interrupt the movement of the door. The closure of switch 460 will also close contacts 462 in the collet-lowering circuit 348 to begin the downward movement of the collet 86. Downward movement of the collet 86 again opens switch 360 which will open contacts 362 in the ram drive circuit and further insure that the ram is not actuated while the platen transfer is being made. The release of switch 360 also opens contacts 366 in the shot pin release circuit 343 and opens contacts 363 in the door-closing circuit 365 to condition this circuit for subsequent operation. The release of switch 360 further closes contacts 368 in the collet-raising circuit 370 to condition this circuit for a subsequent operation.

The downward movement of the collet 86 will release switch 420 which in turn will open contacts 422 in the control circuit 424 to increase the speed of travel to the faster of the two conditions. When the collet is adjacent the platen, presently in the holder 22, switch 430 is depressed to close contacts 432 and reduce the speed of travel of the collet. When the collet 86 reaches the platen 60, switch 372 is closed to close contacts 373 and complete the circuit to solenoid 327 causing an opening of switch 328 in the collet-lowering circuit 348 to interrupt the downward movement of the collet. The closure of switch 372 also closes contacts 378 in the clamping circuit 380 to actuate valve 298 and clamp the collet 86 onto the pin 88.

When the collet is clamped, pressure switch 382 is closed to close contacts 384 and complete the collet-raising circuit 370 and start the travel upwardly of the platen 60. The upward travel of the platen 60 will open switch 434 which opens contacts 440 in the door-closing circuit 365, closes contacts 350 and 436 in the collet-lowering circuit 348 and closes contacts 442 in the collet-clamping circuit 380 to condition all of these circuits for subsequent operation. The upward movement of the collet releases switch 430 to open switch contacts 432 and increase the speed of travel of the collet. When the collet is adjacent the tool support, switch 420 is again depressed to close contacts 422 and decrease the speed of travel of the collet.

When the collet reaches and depresses switch 386, this switch will move switch 388 to interrupt the collet-raising circuit 370. The movement of switch 388 to its second position will also again complete the circuit to stepping switch 394 and interrupt the shot pin circuit 343 while completing the platen pin extension circuit 396 to extend the pins 54 into the platen openings.

The extension of pins 54 releases switch 410 to open contacts 411 and deenergize relay 413. However, switch 385 will not close because pressure switch 382 holds it open. Switch 410 also opens contacts 412. The extension of pins 54 will close switch 400, which will open contacts 379 in the collet-clamping circuit to allow the valve 298 to close and release the collet 86. Release of the collet 86 will allow the platen to drop and to release switch 372 which opens contacts 378 in the collet-clamping circuit 380 and contacts 373 in the collet-lowering circuit 348 for a subsequent operation. Release of the collet 86 will open pressure switch 382 which closes contacts 385 in the collet-raising circuit 370 and causes an upward movement of the collet to its fully retracted position. When the collet reaches the fully retracted position, switch 360 is depressed, which opens contacts 368 and interrupts the collet-raising circuit 370. Switch 360 also closes contacts 362 in the ram drive circuit 364, but the ram drive is not actuated because contacts 484 remain open. Switch 360 also closes contacts 363 in the door-closing circuit 365 and closes contacts 366 in the shot pin retraction circuit 343 to cause the shot pins to retract.

The initial retraction of the shot pins will open switch 339 closing contacts 322 in the shot pin raising circuit to the valve 290, opening contacts 344 between the power source and the transfer circuit, opening contacts 346 in the collet-lowering circuit 348, and opening contacts 340 to solenoid 342 in the shot pin releasing circuit.

When the shot pins are in the fully retracted position, switch 330 is depressed to open contacts 341 in the shot pin retraction circuit 343 and interrupt the circuit to the valve 290. The depression of switch 330 will also close the contacts 336 in the table drive circuit 338 to condition the table drive for a subsequent operation. The depression of switch 330 will also momentarily close switch 492 and energize solenoid 580 in the collet-raising circuit 370, which will momentarily open switch 454 and deenergize relay 452 to open contacts 450 in the collet-raising circuit 370. Likewise, the closure of switch 492 will momentarily energize solenoid 520 to open switch 392 and deenergize solenoid 390 thus allowing the switch 388 to move to its initial condition and open the circuit 370 to the stepping switch 394 to condition the stepping switch for a subsequent operation.

What is claimed is:

1. In combination with an electrochemical machining device having a holder adapted to support an electrode tool in position for machining a workpiece, mechanism for replacing said electrode tool in said holder which comprises: a base; a table supported for movement on said base; a plurality of tool supports on said table, each of said tool supports being adapted to receive an electrode tool therein; means producing relative movement between said base and said table to selectively align respective tool supports with said tool holder; and means for removing an electrode tool from the tool support aligned at any given time with said holder and placing the electrode tool in said holder.

2. The combination as defined in claim 1, including the further improvement of remotely controlled releasable lock means for securing said electrode tool in said holder during a machining operation.

3. The combination as defined in claim 1, in which a source of electric current is connected across said workpiece and said electrode tool, said workpiece and electrode tool being spaced to provide a gap therebetween, and in which said tool and said tool holder have extended cooperating surfaces thereon, said source of electric current being connected to said holder, and said holder and tool being formed of a conductive metal; means defining an electrolyte flow path through said gap and through said electrode tool and holder, said flow path intersecting said surfaces, at least one of said cooperating surfaces having a continuous recess therein surrounding said flow path; and clamping means on said holder for maintaining said surfaces in engagement during a machining operation, whereby (1) said cooperating surfaces provide a current flow path between said tool and said tool holder, and (2) said recess channels away any electrolyte that escapes from said flow path into the space between said surfaces in the immediate vicinity of said flow path to prevent buildup of a force from such escaping electrolyte that would tend to push said cooperating surfaces apart and break electrical contact between them.

4. The combination as defined in claim 3, which includes the further improvement of means supplying electrolyte under pressure through said flow path to said gap.

5. The combination as defined in claim 1, in which each of said tool supports comprises means defining a guide channel for receiving said tool, and latch means releasably retaining said tool in said guide channel.

6. The combination as defined in claim 1, including the further improvement of means sealing said mechanism from said device during a machining operation, said sealing means comprising a housing enclosing said mechanism, said housing having an opening aligned with said holder, and means for sealing said opening during a machining operation.

7. The combination as defined in claim 1, in which said electrode tool comprises a platen, a shaping cathode supported on the platen, and adjusting means on said platen defining the operating position of said shaping cathode in said tool holder.

8. The combination as defined in claim 1, in which said tool removing means comprises first and second relatively movable elements, one of said elements being fixed to said table-supporting base; means adapted to temporarily connect the other of said relatively movable elements to said electrode tool; and means producing relative movement between said elements to remove said tool from said support and position said tool in said holder.

9. The combination as defined in claim 1 in which said table is rotated on said base, in which each of said tool supports comprises a guide channel and means releasably retaining an electrode tool in said guide channel; and in which said electrode tool and said tool holder have cooperating surfaces thereon and which includes: guide means on said tool holder for aligning said cooperating surfaces; adjustable means on said tool, said adjustable means cooperating with said guide means to position said tool in said holder; releasable lock means on said guide means; means for moving said lock means to engage said tool and produce contacting engagement between said cooperating surfaces on said electrode tool and tool holder; means defining an electrolyte flow path through said holder and said tool, said flow path intersecting said surfaces, at least one of said surfaces having a recess therein surrounding said flow path, said recess being spaced from the outer periphery of said cooperating surfaces and communicating with the space surrounding said cooperating surfaces; an electrolyte source under pressure connected to said flow path; and said means for removing an electrode tool including a fluid motor, said motor having a cylinder connected to said base and said motor having a piston rod slidable in said cylinder, said piston rod having releasable latch means for temporarily connecting said piston rod to said tool.

10. The combination as defined in claim 9, including the further improvement of a housing enclosing said mechanism, said housing having a first opening aligned with said holder and a second opening remote from said first opening; a door for said first opening; and drive means for opening and closing said door; said first opening accommodating transfer of said tool to said holder and said second opening accommodating replacement of said tool.

11. The combination as defined in claim 1, including the further improvement of lock means preventing relative movement between said base and said table while an electrode tool is being moved between a tool support and said holder.

12. The combination as defined in claim 11, in which each of said tool supports defines a C-shaped guide channel, said channel being adapted to be disposed above the holder, and tool retaining means releasably retaining a tool in said guide channel.

13. The combination as defined in claim 12 in which said electrode tools each have an opening therein and in which said tool-retaining means includes retractable pin means adapted to be received in said openings; and means carried by said base to cooperate with respective ones of said pin means for retracting said pin means from said opening to allow movement of said tool.

14. Apparatus as defined in claim 1, in which said table is rotatable on said base; said spaced supports each defines a C-shaped guide channel adapted to receive said electrode tools and includes retractable means on said rotatable table retaining said electrode tools in said guide channel; said base has a portion extending above said table; and said tool-removing means includes a fluid ram having relatively movable elements, one of said elements being fixed to said portion of said base, the other of said elements being adapted to be connected to said electrode tool.

15. Apparatus as defined in claim 14, including the further improvement of a housing surrounding said base and table, said housing having a first opening between said holder and said ram; said housing having a second opening remote from said first opening; a movable door cooperating with said first opening; and remote-controlled drive means for moving said door between open and closed positions; said second opening accommodating removal of tools from said guide channels.

16. The combination as defined in claim 1, including the further improvement of a pedestal having an opening therein; a workpiece-supporting member rotatable on said pedestal and having a shaft extending through said opening, drive means for rotating said supporting member on said pedestal; noncurrent conductive means isolating said support member from said pedestal and remotely controlled clamp means releasably connecting a source of electric current to said shaft during a machining operation whereby different portions of said workpiece may be aligned with said holder.

17. The combination as defined in claim 16, and in which said clamp means comprises a pair of jaws located on opposite sides of said shaft, a pair of fluid motor means respectively associated with respective adjacent ends of said jaws, each motor means having one element connected to one of said jaws and a second element connected to the other of said jaws.

18. In combination with an electrochemical machining device having a cathode, said cathode having a source of electric current connected thereto, a holder for said cathode accommodating automatic removal and replacement of said cathode, said holder comprising a conductive metal member having a first contact surface, said source of electric current being connected to said member;

a conductive metal platen having a second contact surface, said cathode being fixed to said platen, said second contact surface cooperating with said first contact surface on said conductive metal member;

guide means on said metal member for receiving said platen and positioning said contact surfaces in juxtaposed relation;

said metal member and platen having a continuous electrolyte flow path therein, said flow path intersecting said contact surfaces;

at least one of said contact surfaces having a continuous recess therein, said recess surrounding said electrolyte flow path and being spaced from the periphery of both of said surfaces, said recess communicating with the space surrounding said contact surfaces; and releasable lock means producing engagement between said surfaces;

whereby (1) said surfaces cooperate to provide a current flow path between said conductive metal member and said cathode, and (2) said recess channels away any electrolyte that escapes from said flow path into the space between said cooperating surfaces in the immediate vicinity of said flow path to prevent buildup of a force from such escaping electrolyte that would tend to push said cooperating surfaces apart and break the electrical contact between them.

19. The combination as defined in claim 18, including the further improvement of adjustable means carried by said platen, said adjustable means cooperating with said guide means to position said contact surfaces with respect to each other.

20. The combination as defined in claim 19, in which said platen comprises a polygonal member having edges adjacent said second surface; said adjustable means including wedge shaped elements cooperating with said edges and means for moving said wedge shaped elements relative to said edges.

21. The combination as defined in claim 18, in which said platen is rectangular and has outer edges, and in which said guide means includes spaced contact points for each of at least two adjacent edges of said rectangular platen, said contact points positioning said platen relative to said holder.

22. The combination as defined in claim 21, including the further improvement of adjustable members interposed between said at least two adjacent edges and said contact points for changing the position of said platen relative to said holder.

23. In combination with an electrochemical machine having a holder adapted to support an electrode tool; holder drive means for moving said holder from a first position towards a workpiece; mechanism for supplying an electrode tool to said holder and removing said electrode tool from said holder comprising:
- a base;
- a table supported for movement on said base;
- a plurality of tool supports on said table with an electrode tool releasably retained in respective ones of said tool supports;
- table drive means producing relative movement between said base and said table to selectively align respective tool supports with said holder at a tool-changing station;
- remotely controlled means for removing an electrode tool from the tool support at said tool-changing station and placing said electrode tool in said holder; and
- releasable lock means for securing said electrode tool in said holder during a machining operation.

24. The combination as defined in claim 23 in which said remotely controlled means for removing said electrode tool includes a first element fixed on said base at said loading station, an extensible and retractable second element carried by said first element and a collet on said second element; said combination further including control means automatically transferring said electrode tools between said tool supports and said tool holder comprising
- latch means responsive to movement of said holder to a first position to lock said table to said base;
- first means responsive to locking of said latch means for extending said second element towards an electrode tool in said holder;
- second means responsive to extension of said second element for connecting said collet to said electrode tool; said first means being responsive to connection of said second element to said electrode tool to transfer said electrode tool from said tool support to said holder;
- third means responsive to placing said electrode tool in said holder for releasing said collet and retracting said second element;
- fourth means responsive to retraction of said second element for activating said releasable lock means and securing said electrode tool in said holder; said fourth means preventing operation of said holder drive means while said lock means are in released position.

25. The combination as defined in claim 23, including the further improvement of a housing enclosing said mechanism and having an opening at said loading station; a door for said opening; and movable between open and closed positions, and control means comprising
- latch means responsive to movement of said holder to a first position to lock said table to said base;
- means responsive to said latch means for moving said door to an open position and preventing operation of said holder drive means;
- means responsive to movement of said door to an open position for operating said remotely controlled means to place an electrode tool in said holder; and
- means responsive to receipt of said tool in said holder for (1) clamping said tool in said holder, (2) moving said door to a closed position and (3) conditioning said holder drive means for operation.

* * * * *